July 12, 1966 S. B. LUFTIG 3,261,017
RADIO INSTRUMENT APPROACH AND LANDING SYSTEM
Filed Oct. 5, 1959 5 Sheets-Sheet 1

INVENTOR.
SANFORD B. LUFTIG
BY
Reynolds, Beach & Christensen
ATTORNEYS

Fig. 4.

United States Patent Office 3,261,017
Patented July 12, 1966

3,261,017
RADIO INSTRUMENT APPROACH AND
LANDING SYSTEM
Sanford B. Luftig, Wichita, Kans., assignor to Boeing Airplane Company, Seattle, Wash., a corporation of Delaware
Filed Oct. 5, 1959, Ser. No. 844,378
13 Claims. (Cl. 343—112)

This invention relates to navigation systems and more particularly concerns an improved system for guiding aircraft to a landing using ground-based radio transmitting equipment, and radio direction finding equipment and display instrumentation on the aircraft. The invention is herein illustratively described by reference to the presently preferred embodiment thereof; however, it will be recognized that certain modifications and changes therein with respect to details may be made without departing from the underlying essentials.

Present-day aircraft traffic and scheduling practices have brought increasingly to issue the limitations and inadequacies of existing instrument landing systems now in use. In the well known ILS system, for example, the landing approach path is defined in azimuth by the null or medial zone between two overlapping fixed transmitted beams, one modulated with 90 cycles and the other with 150 cycles per second. In addition, two marker beacons are placed ahead of the runway along its extended center line, one referred to as the outer marker which is situated approximately five miles from the runway "fence" and the other, the middle marker, situated approximately one mile from the fence. A third or inner marker may be placed at the fence location. These markers or beacons provide an approximate indication of time and distance before touch-down, provided ground speed is known, which requires accurate knowledge of air speed and wind conditions. Wind conditions are variable and difficult to determine. Moreover, upon touch-down, no information is given as to the position and progress of the airplane longitudinally of the runway. Of equal if not greater importance, orientation of the aircraft relative to the runway is not presented in the ILS system at any time during the approach. This can be a particularly serious problem. On suddenly breaking through the overcast into visual contact on the final approach, the pilot must immediately determine, in the few or less remaining seconds, the particular runway toward which the airplane is in fact travelling when, due to crab angle, the airplane may be headed toward a different runway or a taxi strip, for example.

Because of the highly directional characteristics of the lateral guidance antennae in the ILS system, the resultant narrow beams are of no value for navigational approach to the landing field from a distance greater than approximately twenty miles from the runway and then only along the narrow corridor defined by the beams. Furthermore, any slight shift in propagation direction of the radiated lobes, or errors in the complex detection circuits in the aircraft, can result in serious approach errors.

Because of the complexity and critical nature of ground installations in the ILS system, high initial costs and extensive maintenance problems are entailed. Furthermore, spacing between certain portions of the ground equipment is often required to be as great as five miles, which makes the installation and maintenance even more expensive and cumbersome.

GCA radar type systems are usually even more expensive and complex apparatuswise. They require a number of highly trained operators and are, therefore, ordinarily used only under the most severe conditions and in the larger air field installations.

A broad object of the present invention is to provide an improved instrument landing system which provides to the pilot, with greater accuracy than heretofore and with greater continuity of useful information, precise pictorial or graphic data as to position of the airplane not only during the final approach but also during the landing run itself and during the initial or navigational approach to the airport from a considerable distance out, such as two hundred miles or so. Present systems are limited to an angular display of five degrees because of limitations of the ground-based transmitting equipment, and it is an object of my invention to enlarge the angular positional display to approximately eighty-five degrees.

A further and highly important object is to achieve such a result using very inexpensive and simple ground-based equipment, which has no critical adjustments or positional requirements, and which makes possible the use largely of existing aircraft-carried instrumentation such as that commonly referred to as the "integrated instrument system," or similar names, produced in only slightly variant forms by a number of the major manufacturers of aircraft instruments.

An incidental object is to provide an improved system which, in as many respects as possible, adheres to methods and procedures with which experienced pilots are already familiar or with which they may readily become familiar based upon their past experiences with the ILS system, so as to simplify training of pilots and navigators and minimize chances of error due to any necessary departures from previous practices.

A further object is to provide such an improved system which, when using an existing integrated instrument system or the like, provides certain fail-safe or "back-up" features for both the pilot and co-pilot so that it is possible for both readily to detect malfunctioning of equipment and to be fully apprised of the position, progress and attitude of the aircraft at all times during the landing approach and landing run. The type of informational display permitted with this invention is realistically graphic or pictorial, relating both the position and orientation of the aircraft to the runway, and thereby eliminating the usual mental gymnastics required to execute a "blind" approach.

A further object is such a system which lends itself to maximum reliability in operation, minimum maintenance, versatility for installation on any of different types of landing fields, from the smallest to the largest and most complex, and adaptability for installation quickly and easily, by relatively inexperienced personnel, if need be. These desirable characteristics, incidentally, permit use of the system on emergency fields by outpost troops under military conditions, if necessary. Moreover, the transmitters may be of much narrower bandwidth operation than in conventional systems, thus permitting more to be used in an area without encountering radio interference.

A further object is an improved instrument system, not subject to VHF radio line-of-sight limitations, which is useful for long-range approach navigation as well as landing, and which is adaptable to provide flight control signals to an autopilot free of such error sources as atmospheres, wind gusts, "push" of the ground station due to rolling or banking of the airplane, etc. The same apparatus also provides the necessary guidance for blind take-offs when necessary.

As a further objective, the ground-based transmitting equipment maybe located relatively close to the runway perimeter without adversely affecting the resolution or accuracy of positional information presented in the aircraft.

The system is difficult to "jam" and provides minimal useful information to remote monitoring receivers in case of military activities.

While specialized or novel forms of display instrumentation may be devised for use with the improved system, it is preferred to use conventional forms in most cases. For example, a gyrocompass indicator with dual radio magnetic indicator needles and with heading marker is sufficient to present the basic information derivable by the system. Such indicators are herein referred to as RMI. In practice, one or two RMI's may be used either alone or as component indicators in an integrated instrument system as previously suggested, which system normally includes two such RMI's and two associated pictorial deviation indicators of the type having a selected course marker and set knob, deviation bar, magnetic heading marker and gyrocompass card. With such instrumentation in the present system, at least one RMI may continuously, during the final approach, show crab angle, magnetic heading and aircraft plan position both longitudinally and laterally in relation to the runway. A second RMI may present similar data filtered against atmospherics and transient effects such as the apparent change of position caused by rolling or banking the airplane. Preferably one of the pictorial deviation indicators presents to the pilot continuous pictorial plan view information as to the airplane's position laterally of the runway center line or selected course of approach, while the other pictorial deviation indicator presents digital and corresponding pictorial information to the co-pilot as to the airplane's position in transverse relation to the runway fence, i.e., progress of the airplane toward the runway during the final approach, and along the runway after touch-down. The two RMI's provide back-up display information whereas the two pictorial deviation indicators provide mutually complementary data which may be checked against that presented by the RMI's and to some extent against each other, thereby to provide a means for detecting malfunction in any part of the system.

However, the crux of the novel system in this preferred form is represented particularly in the unique placement of two ground-based omnidirectional transmitters in association with a runway to cooperate respectively with two ADF receivers in the airplane. One of these transmitters is placed at the far end of the runway and preferably along the extended center line thereof, whereas the other transmitter is placed at or adjacent to the near end of the runway at an off-set location along the line of the fence. These two omnidirectional transmitters in the usual case radiate continuous-wave radio-frequency energy at distinguishably different assigned wave lengths. Alternatively, they may be impulse operated or interrogated. Of further imprtance from a practical standpoint, they are permitted to be omnidirectional and to be operated in the low or medium frequency range which, of course, makes reception possible from any direction and at relatively great distances out in order to provide reliable long-range navigational guidance to the landing field. Such units may be portable, if desired, and may comprise simple communication transmitters.

In the aircraft preferably two automatic direction finding (ADF) receivers are tuned to the respective ground-based transmitters and cooperate with gyrocompass apparatus to feed direction information to the integrated instrument system indicators. Interposed in the receiver-indicator connections are automatic direction finder coupler circuits which filter out transient signals and eliminate excess rate changes so as to provide steadily accurate display information and reliable control signals for operating at least one of the RMI's, the pictorial deviation indicators, and preferably also the autopilot. If desired, digital computer and indicator apparatus may also be provided, computing the triangulated longitudinal and lateral displacements of the aircraft from the runway.

From a broader standpoint the invention comprises location of a transmitter at the fence and lateral displacement transmitter means referenced to the opposite end of the runway and defining the longitudinal approach path so as to provide in the airplane information on lateral displacement and also relative bearing to an established point along the "fence," laterally offset from the runway.

These and other features, objects and advantages of the invention will become more fully evident from the following description thereof by reference to the accompanying drawings.

Figure 1:
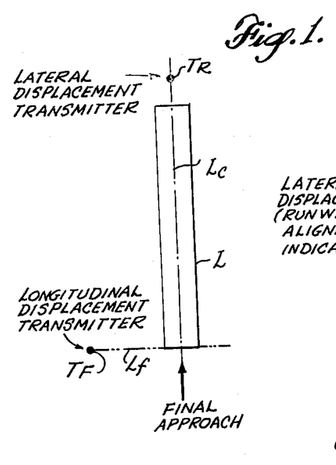
FIGURE 1 is a simplified plan view of a runway installation showing typical transmitter placement according to the invention.

Referring to FIGURE 1, the landing strip L is shown with an assumed direction of approach indicated by the arrow. It has a longitudinal center line $L_c$ and a "fence" line $L_f$, the latter being a term of art well known to airplane pilots and engineers and usually designating the initial end of the runway. However, for present purposes it may be considered as the end line of the runway or a nearby (preferably within a few hundred feet) line parallel thereto established for longitudinal displacement reference purposes. Instead of employing the usual ILS directional beam transmitters and the marker transmitters of that system, the present invention preferably makes use of a single omidirectional transmitter $T_f$ placed substantially along the line of the fence $L_f$ at a predetermined but relatively short distance from center line $L_c$, and a similar transmitter $T_r$ at the far end of the runway substantially on its extended center line. These two transmitters are preferably operated in the low or medium frequency range, one having a somewhat different frequency from the other, so that their respective signals may be received selectively by different automatic direction finding receivers. These transmitters may comprise simple or conventional communications transmitters operating in the range between 100 and 200 kilocycles per second, for example. If desired, they may be operated at higher frequencies such as in the ultra-high frequency range of 200 to 400 megacycles. However, reception of signals in the ultra-high frequency range is limited largely to line-of-sight distances, whereas ranges of 200 miles or thereabouts are readily achieved in the low and medium frequency range due to the strong ground wave attending propagation of these longer wave lengths.

Typically, the transmitter $T_f$ will be located at distance from the runway center line of approximately 1000 feet although this distance is not critical. The distance is not critical, although it must be known and permanently established at a predetermined value so that the airborne instruments operated by the automatic direction finding receivers may be properly and reliably calibrated. Likewise, the location of the transmitter $T_r$ is not critical, it being sufficient that the same be located at or near the far end of the runway and preferably on its center line. If the runway is to be used for landing in either of opposite directions, a second set of transmitters will, of course, be necessary, one on the center line $L_c$ at the end opposite from the transmitter $T_r$ and the other on the line of the runway fence at the opposite end of the runway, at the side thereof opposite from the transmitter $T_f$, and at the same distance from the center line as the transmitter $T_f$.

Preferably both transmitters are vertically polarized for well known reasons in the art of radio wave propagation.

The transmitter $T_r$ is appropriately referred to as the lateral displacement transmitter because during the final approach, this transmitter provides triangulated bearing information relative to the runway center line, hence an indication of lateral displacement from the center line. By the same reasoning, the transmitter $T_f$ is appropriately designated the longitudinal displacement transmitter, because during the final approach and landing run this transmitter provides triangulated bearing information of aircraft position relative to the ends of the runway. It is, of course, evident that the required approach path must be followed at least approximately, requiring triangulated bearing information from both transmitters, in order that true longitudinal and true lateral displacement indications may be provided.

Figure 2:
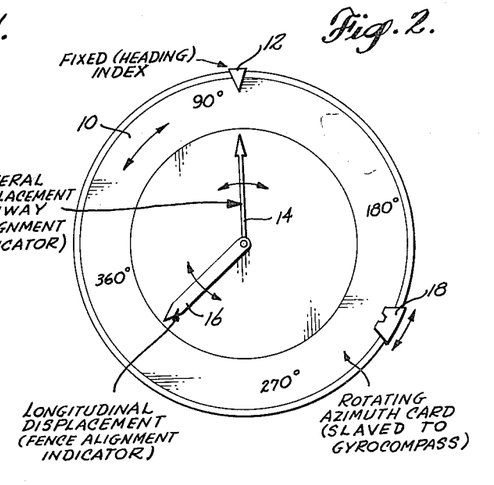
FIGURE 2 is a face view of a typical RMI.

In one embodiment of the invention, lateral and longitudinal displacement information, as well as relative bearing information necessary for a navigational approach using the present invention may be indicated in the airplane on a single gyrocompass indicator (RMI) such as that shown in FIGURE 2. Such indicators per se are in common use and comprise a rotating azimuth or compass card 10 slaved to a magnetic bearing detector and transmitter means such as a conventional gyrocompass. A fixed heading index 12 cooperates with the compass card scale. The instrument has two needles, that designated 14 positioned in accordance with the relative radio bearing information derived from one automatic direction finding receiver. The other needle, 16, is positioned in accordance with information derived from a separate automatic direction finding receiver. In addition, the indicator preferably also includes a selected course marker 18 which is positionable in relation to the azimuth card by means of a course selector knob (not shown) and moves in rotation with the compass card.

Figure 3:
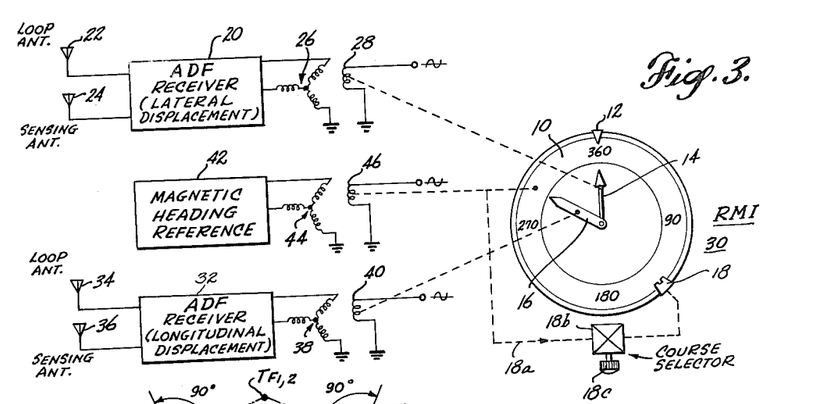
FIGURE 3 is a schematic diagram of instrumentation in the airplane, using a single RMI, according to one embodiment of the invention.

As shown in FIGURE 3, a simplified aircraft receiving and indicator system incorporating the invention includes a first automatic direction finding receiver 20 including the usual loop antenna 22 and sensing antenna 24. This lateral displacement receiver delivers its output through a suitable position transmitter such as a selsyn or other synchro device to the stator coils 26 of a receiver synchro having a rotor coil 28 which continuously seeks the relative bearing position transmitted from the receiver 20 depending upon the relative bearing to the radio transmitter sensed by receiver 20. The coil 28 is or may be mounted in the housing of the RMI 30 to position the needle 14 accordingly. During a navigational approach to a landing field having the omidirectional transmitters $T_r$ and $T_f$ (FIGURE 1) needle 14 continuously points in the relative direction from the airplane to the lateral displacement transmitter $T_r$.

A second automatic direction finding receiver 32 energized by the usual loop antenna 34 and sensing antenna 36 similarly energizes the stator coils 38 of a receiving synchro so that the rotor coil 40 thereof may position the indicator needle 16 to point continuously in the relative bearing direction toward the longitudinal displacement transmitter $T_f$. A suitable magnetic heading reference device 42, which may comprise a conventional gyrocompass and flux gate transmitter, for example, energizes the stator coils 44 of a receiving synchro whose rotor 46 is connected to the compass card 10 so that the latter continuously, in cooperation with the stationary relative bearing index 12, provides an indication of relative magnetic bearing of the aircraft heading. The course selector index 18 rotates with the compass card, due to the mechanical coupling 18a from the synchro rotor 46. Through a differential mechanism 18b and a course selector knob 18c the marker 18 may be positioned at any desired bearing point around the azimuth scale of the compass card. Such mechanism is well known in the art and is described herein for purposes of illustrating the preferred application of the invention in a simplified indicator system by which the pilot may make efficient use of the information derived from the particular positioning of the two omnidirectional transmitters $T_r$ and $T_f$.

Figure 4:
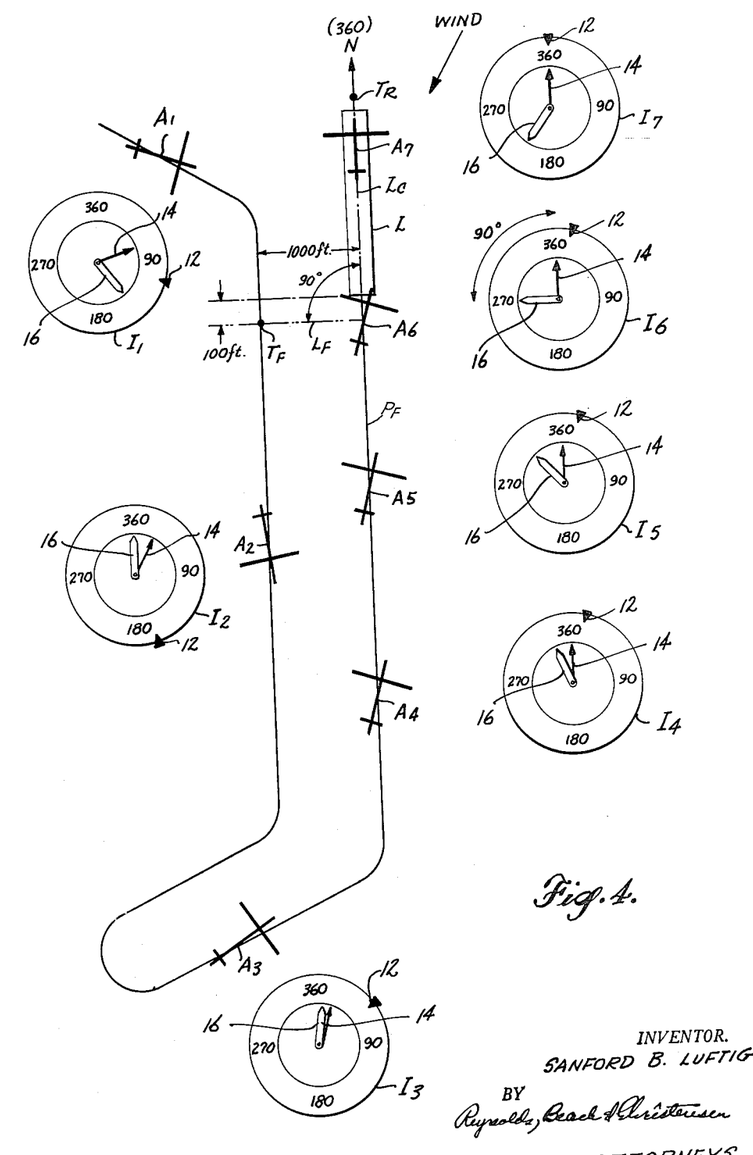
FIGURE 4 is a diagram showing the relationship between RMI readings and successive positions of an airplane executing a typical approach and landing, with the system shown in FIGURE 3.

FIGURE 4 illustrates a typical dog-leg approach path and successive instrument indications observable by the pilot at different points along such path while executing a landing with the system shown in FIGURE 3. For convenience in illustration, it is assumed that the landing field is oriented in a magnetic north-south direction and that the approach is from the south. The two ground-based omnidirectional transmitter $T_r$ and $T_f$ are positioned as in FIGURE 1. The airplane is assumed to be approaching the landing field initially from the northwest quarter.

During the initial approach, the airplane, in position A1, is flying a course and heading which produces the instrument readings shown at $I_1$ in the figure. As will be observed, the lateral displacement needle 14 points toward the lateral displacement transmitter $T_r$ and the longitudinal displacement needle 16 points toward the longitudinal displacement transmitter $T_f$. This immediately tells the pilot that he is approaching the landing field from the northwest quarter. As the pilot approaches the desired dog-leg approach path, the needle 16 for the particular runway orientation moves toward the 180 degree compass reading, at which point the pilot executes a turn in order to fly south parallel to the field. He knows when he crosses the fence line $L_f$ by the sudden rotation of the needle 16 through 180 degrees. When the airplane is well along the initial portion of the approach path, as at position A2, the indicator instrument appears as at $I_2$. As long as the needle 16 remains at the 360 degrees point on the compass scale, the pilot knows he is properly executing the initial phase of the approach, and by convergence of the needle 14 toward the needle 16 to a certain relative position the pilot knows he may now execute the necessary turns in guiding the airplane into the final approach path $P_f$. At point A3 the indicator appears as at $I_3$, and when the indicator needle 14 reads 360 the pilot knows he is in line with the runway and must execute his turn into the final approach path $P_f$. Initially during the final approach the airplane indicator needles move very slowly. Thus, in position A4, the needles 14 and 16 are only gradually moving apart, the needle 14 pointing steadily in the 360 degree direction as long as the pilot properly keeps the airplane on the final approach path coinciding with the extended runway center line $L_c$. The needle 16 begins to move progressively away from the needle 14 as the angular bearing to the transmitter $T_f$ progressively increases more rapidly during closing of the distance to the fence, as indicated at position A5, $I_5$. During this approach, of course, the pilot is also observing altitude indications and is necessarily compensating for cross wind in the act of maintaining the needle 14 steadily directed at the 360 degree point on the compass scale. When he stabilizes the position of the needle 14 in relation to the compass scale, he has only to observe the relative position of the heading index 12 in order to obtain an accurate indication of crab angle. When finally the airplane reaches the fence line $L_f$, the two needles 14 and 16 are at right angles to each other, the needle 16 pointing directly toward the transmitter T_f or at the 270 degree marker on the compass scale and the needle 14 still pointing in the 360 degree direction. This is shown at position A6 and by the indicator readings at I_6. The pilot is usually sufficiently low to the ground in this case that he has already or will shortly break through overcast. At that point he again observes the relative position of the heading index 12 to determine crab angle so that when he does break through he knows precisely the runway toward which the airplane is moving and is not confused by crab angle. As the airplane settles on the runway, the pilot keeps the indicator needle 14 continuously directed toward the 360 degree compass mark and observes the progressive movement of the needle 16 away from the needle 14 as the needle 16 continues to point toward the longitudinal displacement transmitter T_f. At point A7, the airplane is approaching the far end of the runway and it is important in many situations, such as while landing during military blacked-out conditions at night or under extremely foggy conditions, that the pilot know this fact. In position A7, represented by indicator readings shown at I_7, the pilot observes the position of the needle 16 at a certain point on the compass scale and knows that he has advanced to the point along the runway at which he must apply the brakes.

Thus, the pilot is able to observe his position accurately during the initial approach and also during the progress of the landing run, so as to be able to avoid belated braking. Furthermore, because the pilot is able, by use of the guidance information afforded from lateral displacement transmitter T_r to establish a definite indication of crab angle during the final approach, he has no problem with cross wind and is not subject to the guess work or confusion which can result under severe conditions when landing with present day landing systems. He is in no danger of confusion on suddenly breaking through the overcast and finding that the airplane is heading toward one runway whereas the actual movement of the airplane is toward another.

It will also be observed that the omnidirectional characteristics of the two transmitters T_r and T_f as well as the permissive use of low frequency or medium frequency operation permits navigational approaches to landing fields from great distances using the same instrumentalities in the airplane and the same ground-based equipment as that which gives the desired critically accurate information described above during the landing operation itself. As later described, instruments with scale expansion for close navigational control during final approach, as compared with initial navigational approach operation, may conveniently be provided to increase the useful accuracy of the system.

Figures 5, 9:
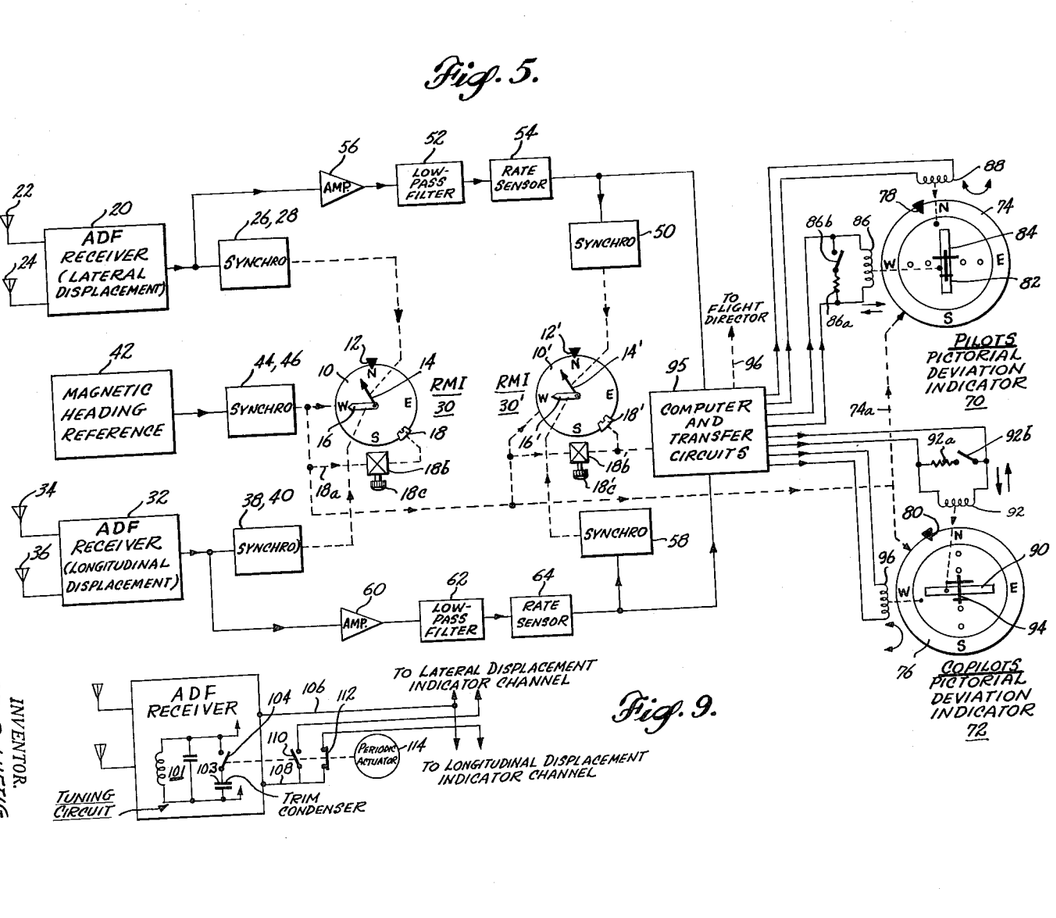
FIGURE 5 is a partially schematic and partially block diagram showing incorporation of the airplane instrumentation of the invention in a typical conventional integrated instrument system.
FIGURE 9 is a diagram partially schematic, of an arrangement permitting a single ADF receiver to serve both indicator channels.

FIGURE 5 illustrates incorporation of the invention in a conventional integrated instrument system and illustrates the very slight modification of that system insofar as the aircraft-carried components are concerned in order to adapt the same for purposes of this invention. In this figure parts which correspond to those shown in FIGURE 3 bear similar reference numerals and will not be described again. In this, the preferred form of indicator system, a second RMI 30' is also provided which provides information identical to the first RMI 30 except for the elimination of atmospheric and transient effects which influence the readings of the RMI 30. For this purpose, signals from the automatic direction finding receiver 20 which control the position of the lateral displacement needle 14' through the synchro receiver 50 are first passed through a low-pass filter 52 and a rate sensing circuit 54 after amplification in the amplifier 56 which compensates for the attenuation in the filter and rate sensor circuits. The low-pass filter 52 may be of any suitable low-pass type which has a cut-off frequency above the frequency components which make up the maximum signal variations from the receiver 20 due to changes of radio bearing, but sufficiently low to eliminate atmospherics and similar disturbance effects which are mixed with the desired signals. The rate sensor 54 comprises a circuit or apparatus which is capable of sensing above-normal rates of change of signal, such as those caused by roll and bank of the airplane as well as other effects which cause apparent radio bearing changes not representing true changes of bearing. During the presence of these excessive rates of change the circuit or apparatus 54 is operative to maintain the previous relatively stable signal level passing to the servo 50, so as to avoid disturbing the position of the needle 14'. Such apparatus or circuit devices capable of accomplishing this purpose are in themselves well known in the art and may be of any of different types which require no separate description herein.

Similarly, the automatic direction finding receiver 32 is coupled to the synchro 58 which operates the longitudinal displacement needle 16', through an amplifier 60, a low-pass filter 62 and a rate sensor 64 corresponding to the similarly designated components in the other channel. Thus, both radio bearing needles 14' and 16' are stabilized against disturbances which produce undesired fluctuations in the positions of the needles of indicator 30'. At the same time, the RMI 30 provides a back-up or check device for determining the operativeness of the RMI 30' and the circuits which control it. In the example the compass card 10' of RMI 30' is shown positioned by the same synchro (44, 46) as that which operates the compass card 10 of RMI 30. A separate servo is or may be desirable in practice, however. A differential 18'b and course selector knob 18'c controls position of the course or heading index 18' in relation to the compass card.

In this complete indicator system a separate pictorial deviation indicator 70 is provided in the pilot's instrument panel and a similar indicator 72 in the co-pilot's panel. The indicator 70 provides lateral displacement information in a plan-position pictorial form, whereas the indicator 72 provides longitudinal displacement information in a plan-position pictorial form. Indicators of this type are conventional in the art.

In order to operate the indicator 70, its compass card 74 is enslaved to the compass cards of RMI's 30 and 30', as indicated by the mechanical coupling line 74a in the diagram. This same coupling requirement applies to the compass card 76 of indicator 72. Each indicator has a magnetic bearing index, 78 and 80, respectively.

Lateral displacement indicator 70 has a laterally shiftable pictorial representation 82 of a runway and a centrally located rotatable airplane image representation 84 superimposed thereon. The runway "bar" 82 is laterally movable in relation to the airplane image 84 by energization of a coil 86 so as to provide indications of the position of the airplane laterally with respect to the runway center line. The airplane image 84 is rotatable about the indicator axis in accordance with signals from the control coil or rotor 88 of a receiving synchro, the stator of which is not shown in the view. Such indicators and the details of construction thereof are well known in the art.

Similarly, the longitudinal displacement indicator carries a movable bar 90 which may be shifted in directions perpendicular to its length by means of the control coil 92. It also carries, superimposed on the bar image and mounted centrally on a means, independently rotatable, an airplane image 94 rotation of which is controlled by the control coil 96 corresponding to the coil 88 of indicator 70.

The function of indicator 70 is to indicate to the pilot the lateral displacement of the airplane in relation to the runway center line; also, crab angle of the airplane in relation to the desired flight path. The function of the indicator 72 is to provide information to the co-pilot concerning progress of the airplane in relation to the fence, as indicated by the bar 90 and its position relative to the airplane image 94. In order to provide these pilot and co-pilot monitored indications, signals from the rate sensors 54 and 64 are fed through suitable computer apparatus 95 which converts angular radio bearing information into lateral or lineal displacement of the respective bars 82 and 90 relative to the airplane images, such computation involving the solution of simple trigonometric functions on well known principles of triangulation. Moreover, like the needles 14' and 16' of the RMI 30', the airplane images 84 and 94 are oriented in relation to the compass card scale so as to show the true radio heading or bearing of the airplane and alone, or in conjunction with the radio bearing index 78 or 80, provide to the pilot and co-pilot an indication of crab angle during the final approach.

Figure 6:
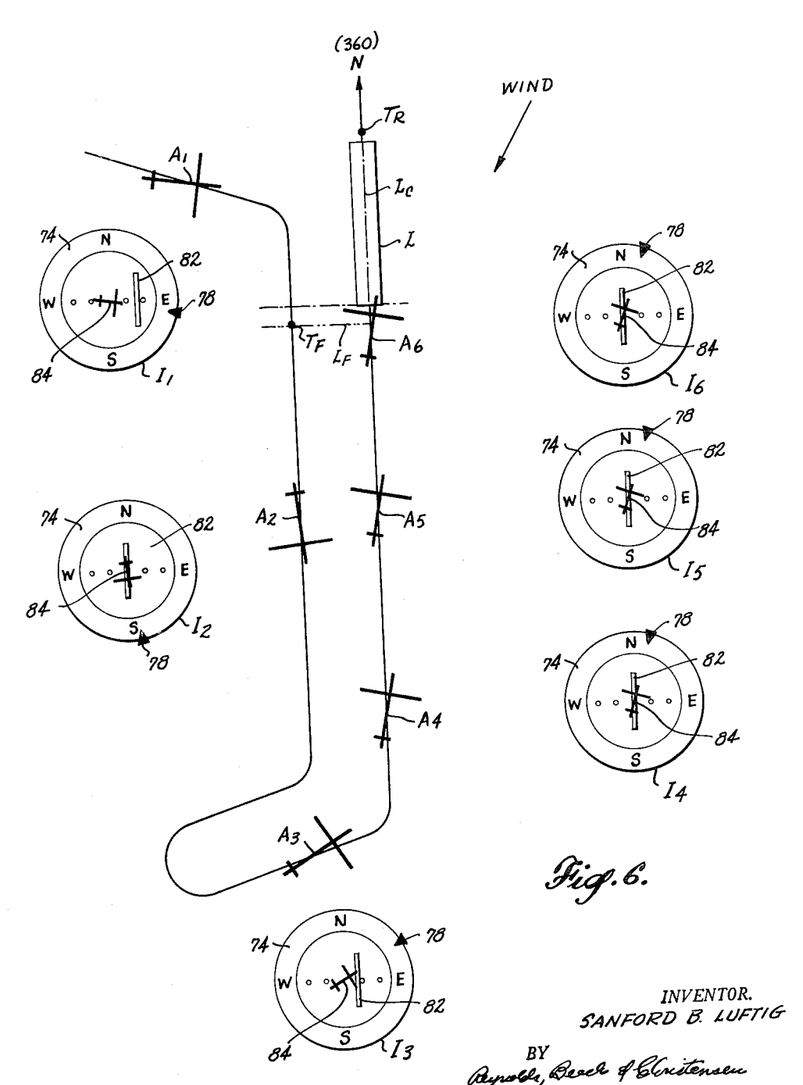
FIGURE 6 is a diagram similar to FIGURE 4 showing the appearance of one pictorial deviation indicator in the system of FIGURE 5 during a typical approach and landing.
Figure 7:
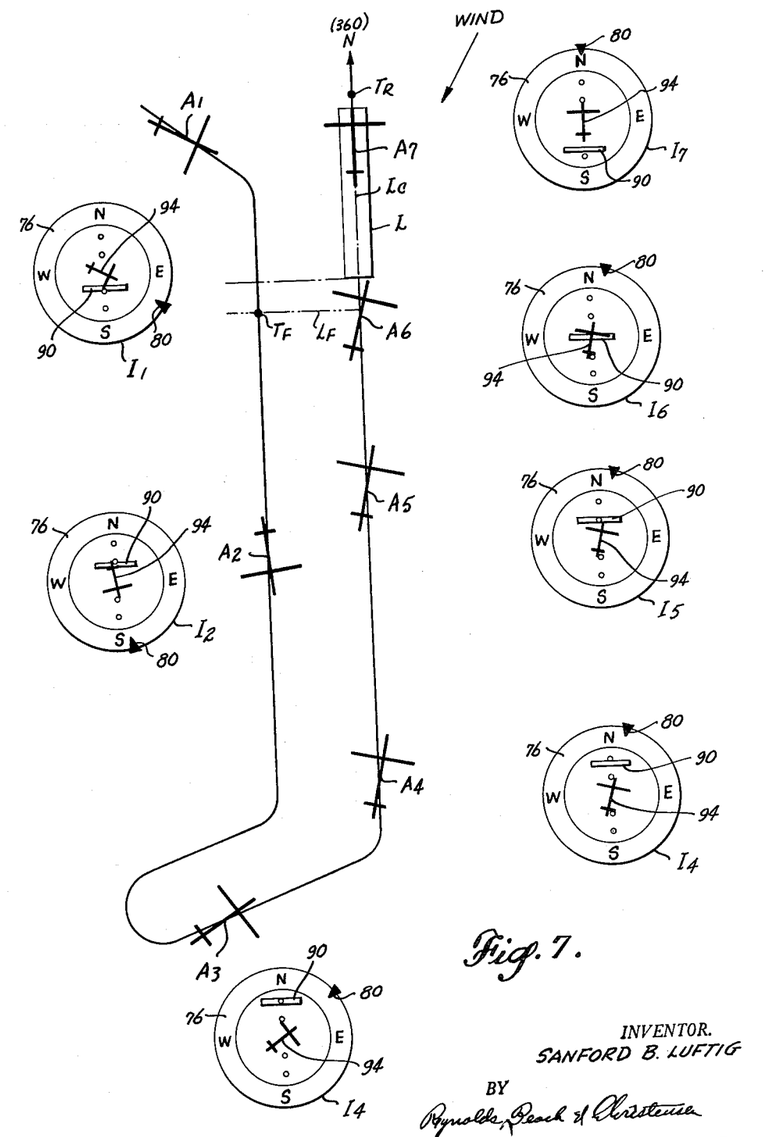
FIGURE 7 is a view similar to FIGURE 6, but illustrating the action of the other pictorial deviation indicator.

FIGURE 6 illustrates the indications provided on the pilot's lateral displacement indicator 70 at different points during the execution of an approach comparable to that illustrated in FIGURE 4, while FIGURE 7 illustrates the co-pilot's display during the same approach, at similar points. In both cases it will be recognized that the information provided to the pilot and co-pilot is equivalent to that provided in the system of FIGURE 3 but is presented in a more graphic or pictorial form, hence is probably more readily and reliably interpreted. Preferably the lateral displacement ADF receiver 20 is initially tuned to the frequency of the transmitter $T_f$ so that the bar 82 and airplane reference symbol 84 coincide when the airplane is on the outbound portion of the approach path, as at point $A_2$. Then, as the final turn is made receiver 20 is retuned to transmitter $T_r$ to make the final approach.

Because transmitter $T_f$ is the more convenient and logical as a homing base or point for making a navigational approach to the field from a distance out it is usually desirable that it be considerably more powerful than the minimum requirement for transmitter $T_r$.

In order to provide an expanded scale display of longitudinal and lateral displacements, coils 92 and 86 have shunt resistances 92a and 86a, respectively, which may be disconnected by the opening of switches 92b and 86b, respectively, during the final phases of the landing approach, so that maximum sensitivity in the indications are obtained giving the pilot the necessary close information regarding displacement.

As shown at 96, the output of computer 95 may be fed also to a flight director or automatic pilot (not shown) to control navigation of the airplane, especially during the long range approach phase of a landing. It will, of course, be understood that other instruments and apparatus than those shown in FIGURE 5 are and will be incorporated in the total integrated instrument system in which the invention is used and that only the elements thereof necessary to an understanding of this embodiment of the present invention have been shown in this figure.

Figure 8:
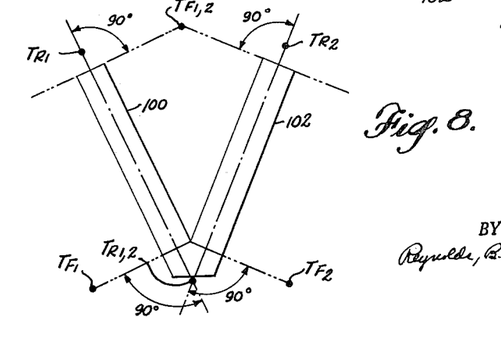
FIGURE 8 is a plan view illustrating typical ground-based transmitter placement in a divergent dual strip landing field.

FIGURE 8 illustrates application of the system to a landing field having dual runways mutually divergent. At the line of intersection of the longitudinal center lines of these runways 100 and 102 a lateral displacement transmitter $T_r1,2$ is located, whereas at the opposite end of the runway 100 a longitudinal displacement transmitter $T_r1$ is located on the center line, and a similar transmitter $T_r2$ on the center line of runway 102 at its opposite end. At the intersection end of the runway 100, a second, longitudinal displacement transmitter $T_f1$ is placed, whereas its counterpart $T_f1,2$ is placed on the fence at the opposite end of runway 100 and at the opposite side of such runway. This transmitter $T_f1,2$, serves also for the runway 102, whereas a second, longitudinal displacement transmitter $T_f2$ is placed at the intersection end of runway 102. Thus, the transmitters $T_f1,2$ and $T_r1,2$ serve in a dual capacity for both runways and permit landing from either direction of approach on either runway with only six ground-based omnidirectional transmitters, whereas eight would be required in an installation in which the runways were separate and apart, or no effort were made to permit transmitters to perform multiple duty.

In some cases, especially in small aircraft having limited space and load capacity for extra equipment, a single ADF receiver may be used serving both channels in the indicator system. An arrangement permitting this is shown in FIGURE 9, in which, by a periodic switching means, the receiver is tuned alternately to each of the two ground-based transmitter frequencies and its output correspondingly to each of the associated indicator channels. As shown, this is preferably done by employing a receiver tank circuit 101 tuned to the frequency of one of the transmitters, such as $T_f$ and a pad or trim condenser 103 periodically connected by a switch 104 in shunt with this circuit to shift its resonance frequency to that of the other transmitter $T_r$. At the same time the receiver output appearing across leads 106 and 108 is switched, by switches 110 and 112, from the longitudinal displacement indicator circuits to the lateral displacement indicator circuits. While the retuning and switching functions may be performed electronically, the illustrated mechanical or motorized unit 114 is satisfactory. The rate of switching by which the two indicator channels are operated from the same ADF receiver on a time-sharing basis, is chosen so that the switching frequency, as a component in the receiver output, does not interefere with or disturb indicator operation. If desired it may be filtered out in the receiver itself, or by other well known arrangements, even indicator instrument mechanical inertia.

On the basis of the foregoing description and accompanying illustrations it will be evident that the objects and purposes of the invention are attainable in practicable and desired manner using the embodiments depicted. It will be recognized, however, that the novel system features involved are broader in principle than the examples given, and that various modifications and variations therein may be provided within the skill of the art.

I claim as my invention:

1. In an airplane radio instrument ground track guidance system including a pair of ground-based omnidirectional transmitters operating substantially continuously at distinguishably different radio frequencies, one such transmitter being located at the far end of the landing field runway and substantially in alignment with the center line thereof, and the other such transmitter being located at the approach end of the runway and displaced laterally from said runway substantially on the line of the runway "fence," the combination comprising automatic direction-finding means including first and second direction-finding receivers respectively tunable to the different transmitter frequencies, first and second pictorial deviation indicators having a magnetic bearing indicator element, a bearing reference source operatively connected to said elements to indicate magnetic bearing, each of said indicators having a relative radio bearing indicator element connected to said automatic direction-finding receiver means to indicate relative bearing of the airplane to the first of said transmitters, said first indicator having a lateral displacement indicator element and said second indicator having a longitudinal displacement indicator element, computer means connected to said receiver means and computing longitudinal and lateral displacement of the airplane from the landing field, and actuating means controlled by said computer means and connected respectively to said latter two indicator elements to indicate such lateral and longitudinal displacement.

2. The combination defined in claim 1, including means in the connections between the receiver means and the respective actuating means, operable at will to expand the scale of the indications, thereby to permit closer guidance of the airplane during the final phases of landing the airplane.

3. The combination defined in claim 2, and low-pass filter means interposed in the connection between the receiver means and the actuator means, said filter means having a characteristic which attenuates signal frequencies materially above the frequency components representing radio bearing signal changes.

4. The combination defined in claim 1, and low-pass filter means interposed in the connection between the receiver means and the actuator means, said filter means having a characteristic which attenuates signal frequencies materially above the frequency components representing radio bearing signal changes.

5. In an airplane radio instrument ground track guidance system for use with a pair of ground-based omnidirectional transmitters operating substantially continuously at distinguishably different radio frequencies, one such transmitter being located at the far end of the landing field runway, and substantially in alignment with the center line thereof, and the other such transmitter being located at the approach end of the runway and displaced laterally from said runway substantially on the line of the runway "fence," the combination comprising automatic direction-finding receiver means tunable to each of the two different ground-based transmitter frequencies, first and second pictorial deviation indicators having a magnetic bearing indicator element, a bearing reference source operatively connected to said elements to indicate magnetic bearing, each of said indicators having a relative radio bearing indicator element connection to said automatic direction-finding receiver means to indicate relative bearing of the airplane to the first of said transmitters, said first indicator having a lateral displacement indicator element and said second indicator having a longitudinal displacement indicator element, computer means connected to said receiver means and computing longitudinal and lateral displacement of the airplane from the landing field, and actuating means controlled by said computer means and connected respectively to said latter two indicator elements to indicate such lateral and longitudinal displacement.

6. The combination defined in claim 5, including means in the connections between the receiver means and the respective actuating means, operable at will to expand the scale of the indications, thereby to permit closer guidance of the airplane during the final phases of landing the airplane.

7. The combination defined in claim 6, and low-pass filter means interposed in the connection between the receiver means and the actuator means, said filter means having a characteristic which attenuates signal frequencies materially above the frequency components representing radio bearing signal changes.

8. The combination defined in claim 5, and low-pass filter means interposed in the connection between the receiver means and the actuator means, said filter means having a characteristic which attenuates signal frequencies materially above the frequency components representing radio bearing signal changes.

9. In an airplane radio instrument ground track guidance system including a pair of ground-based substantially omnidirectional transmitters operating substantially continuously with distinguishable signal characteristics, on such transmitter being located at the far end of the landing field runway and substantially in alignment therewith, and the other such transmitter being located at the approach end of the runway and displaced laterally from said runway substantially at the line of the runway "fence," the combination comprising automatic direction-finding means including first and second receiver means respectively selective to the different transmitter characteristics, indicator means having a magnetic bearing indicator element, a bearing reference source operatively connected to said element to indicate magnetic bearing, said indicator means having a selective radio bearing indicator element connected to said direction-finding means to indicate relative bearing of the airplane to one of said transmitters, said indicator means including a lateral displacement indicator element and a longitudinal displacement indicator element, computer means connected to said receiver means and operable to compute longitudinal and lateral displacement of the airplane from the landing field, and actuating means controlled by said computer means and connected respectively to said latter two indicator elements to indicate thereby such lateral and longitudinal displacement.

10. The combination defined in claim 9, including means in the connections between the receiver means and the respective actuating means, operable at will to expand the scale of the indications, thereby to permit closer guidance of the airplane during the final phases of landing the airplane.

11. In an airplane radio instrument ground track guidance system for guiding an airplane to a landing on a landing field runway, comprising, in the airplane, automatic direction-finding means including first and second receiver means respectively selective to each of two different transmitter characteristics, indicator means having a magnetic bearing indicator element, a bearing reference source operatively connected to said element to indicate magnetic bearing, said indicator means having a relative radio bearing indicator element connected to said direction-finding means to indicate relative bearing of the airplane to a remote transmitter having one of said characteristics, said indicator means including a lateral displacement indicator element and a longitudinal displacement indicator element, computer means connected to said receiver means and operable to compute longitudinal and lateral displacement of the airplane from the landing field, and actuating means controlled by said computer means connected respectively to said latter two indicator elements to indicate thereby such lateral and longitudinal displacement; the combination of two ground-based substantially omnidirectional transmitters operating substantially continuously with distinguishable signal characteristics, one such transmitter being located at the far end of the landing field runway and substantially in alignment therewith, and the other such transmitter being located at the approach end of the runway and displaced laterally from the runway substantially at the line of the runway "fence."

12. In an airplane instrument ground track approach and landing system for use with an omnidirectional ground-based transmitter located at the near end of a landing field runway but displaced laterally from said runway substantially on the line of the runway "fence"; a direction-finding receiver tunable to the transmitter frequency and operable to derive relative bearing from the airplane to the transmitter, a heading reference deriving relative magnetic bearing of the airplane, means to permit guiding the airplane along an approach path substantially aligned with the runway, indicator means having a longitudinal displacement indicator element, computer means connected to the receiver and computing longitudinal displacement of the airplane from the landing field, and means operatively connecting said computer means to said longitudinal displacement indicator element to indicate longitudinal displacement of the airplane from the runway, said indicator means also including a magnetic bearing indicator element connected for actuation by said magnetic heading reference.

13. In an airplane instrument ground-track approach and landing system for use with an omnidirectional ground-based transmitter located at the far end of the landing field runway in substantial alignment therewith; a direction-finding receiver tunable to the transmitter frequency and operable to derive relative bearing from the airplane to the transmitter, a heading reference deriving relative magnetic bearing of the airplane, means to measure and indicate distance of the airplane to the runway, indicator means having a lateral displacement indicator element, computer means connected to the receiver and computing longitudinal displacement of the airplane from the landing field, and means operatively connecting said computer means to said longitudinal displacement indicator element to indicate longitudinal displacement of the airplane from the runway, said indicator means also including a magnetic bearing indicator element connected for actuation by said magnetic heading reference.

References Cited by the Examiner

UNITED STATES PATENTS

| | | | |
|---|---|---|---|
| 2,017,908 | 10/1935 | Leib | 343—112 X |
| 2,226,860 | 12/1940 | Greig | 343—101 X |
| 2,255,659 | 9/1941 | Gage | 343—112 |
| 2,264,056 | 11/1941 | Thacker et al. | 343—108 |
| 2,264,279 | 12/1941 | Dearing | 343—112 |
| 2,379,362 | 6/1945 | Lear | 343—101 |
| 2,393,337 | 1/1946 | Philips | 343—108 |
| 2,736,893 | 2/1956 | Manteuffel et al. | 343—108 |
| 3,023,411 | 2/1962 | Nerison | 343—112 X |

FOREIGN PATENTS

| | | |
|---|---|---|
| 884,196 | 4/1943 | France. |
| 174,429 | 1/1922 | Great Britain. |
| 692,812 | 6/1953 | Great Britain. |

CHESTER L. JUSTUS, *Primary Examiner.*

FREDERICK M. STRADER, *Examiner.*

H. C. WAMSLEY, R. A. FARLEY, R. E. BERGER,
*Assistant Examiners.*